United States Patent
Samoto et al.

(10) Patent No.: US 8,919,531 B2
(45) Date of Patent: Dec. 30, 2014

(54) IMAGE RECORDING APPARATUS

(71) Applicants: Kenji Samoto, Nagoya (JP); Yuta Uchino, Nagoya (JP)

(72) Inventors: Kenji Samoto, Nagoya (JP); Yuta Uchino, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 59 days.

(21) Appl. No.: 13/850,660

(22) Filed: Mar. 26, 2013

(65) Prior Publication Data
US 2013/0277170 A1  Oct. 24, 2013

(30) Foreign Application Priority Data

Apr. 23, 2012 (JP) .................................. 2012-097853

(51) Int. Cl.
*B65G 47/46* (2006.01)
*B41J 11/00* (2006.01)
*B65G 39/18* (2006.01)
*B41J 3/60* (2006.01)

(52) U.S. Cl.
CPC ............. *B65G 39/18* (2013.01); *B41J 11/0045* (2013.01); *B41J 3/60* (2013.01); *B41J 11/006* (2013.01)
USPC ......... 198/369.1; 271/117; 399/397; 400/188

(58) Field of Classification Search
USPC ......... 198/367, 367.1, 369.1, 369.2; 271/117, 271/118, 171, 186; 399/397, 401; 400/188, 400/611; 347/104
See application file for complete search history.

(56) References Cited

U.S. PATENT DOCUMENTS

| 5,697,880 | A | * | 12/1997 | Auerbach ................... 198/369.2 |
| 5,791,645 | A | * | 8/1998 | Takada .......................... 271/3.03 |
| 6,068,065 | A | * | 5/2000 | Mehew et al. ................. 172/785 |
| 8,172,225 | B2 | * | 5/2012 | Tanahashi ...................... 271/225 |
| 8,240,655 | B2 | * | 8/2012 | Samoto et al. ................ 271/3.19 |
| 8,636,135 | B2 | * | 1/2014 | Yamamoto .................. 198/369.2 |
| 8,746,687 | B2 | * | 6/2014 | Samoto et al. ................. 271/186 |
| 8,768,235 | B2 | * | 7/2014 | Asada et al. ................... 399/397 |
| 2009/0087239 | A1 | * | 4/2009 | Uchino et al. ................. 399/401 |
| 2010/0278575 | A1 | * | 11/2010 | Mizuno et al. ................. 399/401 |
| 2011/0157664 | A1 | | 6/2011 | Samoto et al. |
| 2011/0158725 | A1 | | 6/2011 | Asada et al. |
| 2011/0311294 | A1 | * | 12/2011 | Kawamata et al. ........... 400/611 |

FOREIGN PATENT DOCUMENTS

JP  2011-136831 A  7/2011

* cited by examiner

*Primary Examiner* — James R Bidwell
(74) *Attorney, Agent, or Firm* — Banner & Witcoff, Ltd.

(57) ABSTRACT

An image recording apparatus includes an apparatus main-body, a tray, a first transporting path including a curved portion and an extending portion connected to the curved portion, a feed roller which feeds a sheet from the tray to the first transporting path, a transporting roller which transports the sheet, a recording portion which records an image on the sheet transported through the extending portion, a first guide member defining an outer wall of the curved portion, a second guide member defining an inner wall of the curved portion, a second transporting path which connects a portion of the extending portion and a portion of the curved portion, a third guide member defining an upper wall of the second transporting path, a fourth guide member defining a lower wall of the second transporting path, and a fifth guide member provided to a rotating front-end side of the fourth guide member.

11 Claims, 8 Drawing Sheets

IMAGE RECORDING APPARATUS

CROSS REFERENCE TO RELATED APPLICATION

The present application claims priority from Japanese Patent Application No. 2012-097853 filed on Apr. 23, 2012 the disclosure of which is incorporated herein by reference in its entirety.

BACKGROUND OF THE INVENTION

1. Field of the Invention

The present invention relates to an image recording apparatus which records an image on both surfaces of a sheet.

2. Description of the Related Art

An image recording apparatus which records an image on both surfaces of a sheet has hitherto been known. In this image recording apparatus, a sheet which has been fed from a tray is turned around and transported to a recording section, and an image is formed on a first surface. The sheet having an image recorded on the first surface is transported to the recording section upon being turned around once again by a switch-back transporting, and an image is recorded on a second surface. In the image recording apparatus, for a so-called jamming elimination which is a process for removing a sheet jammed in a transporting path, a part of the transporting path is opened and becomes accessible.

SUMMARY OF THE INVENTION

However, for opening the transporting path, it is necessary to make an arrangement such that a guide member which defines the transporting path is rotatable, or removable. Therefore, a gap is developed between the movable guide member and the other guide member. When the sheet passes through the gap between the guide members, a behavior of the sheet is sometimes unstable, and may become a cause of a paper jam and noise. Particularly, as a radius of turnaround of the transporting path is made smaller for small-sizing and slimming of the apparatus, such problem is sometimes arise.

An object of the present invention is to provide an image recording apparatus which realizes the opening of the transporting path and a smooth transporting of the sheet, in an image forming apparatus which is capable of carrying out image recording on both surfaces of the sheet.

According to an aspect of the present teaching, there is provided an image recording apparatus including: an apparatus main-body; a tray configured to be drawn out from the apparatus main-body and configured to support a sheet; a feed roller configured to feed the sheet from the tray to a first transporting path, wherein the first transporting path includes a curved portion which is curved upward and an extending portion which is connected to the curved portion; a transporting roller configured to transport the sheet in a transporting direction and disposed downstream of the feed roller with respect to the transporting direction in the first transporting path; a recording portion disposed downstream of the transporting roller with respect to the transporting direction in the first transporting path and configured to record an image on the sheet which is transported through the extending portion of the first transporting path; a first guide member configured to define an outer wall of the curved portion of the first transporting path and configured to move between a first position at which the first guide member defines the curved portion, and a second position at which the first guide member opens the curved portion of the first transporting path; a second guide member configured to define an inner wall of the curved portion of the first transporting path; a third guide member configured to define an upper wall of a second transporting path, wherein the second transporting path is configured to connect a portion of the extending portion, which is located downstream of the recording portion with respect to the transporting direction, and a portion of the curved portion, which is located upstream of the transporting roller with respect to the transporting direction; a fourth guide member configured to define a lower wall of the second transporting path and configured to pivot between a third position at which the fourth guide member defines the second transporting path and a fourth position at which the fourth guide member is away downward from the third guide member than the third position; and a fifth guide member disposed at a pivoting front-end side of the fourth guide member, and configured to pivot between a fifth position at which the fifth guide member contact the first guide member and a sixth position at which the fifth guide member is separated from the first guide member, in a state that the fourth guide member is at the third position and the first guide member is at the first position.

When the fourth guide member is at the fourth position and the first guide member is at the second position, the first transporting path and the second transporting path are accessible. Accordingly, it is possible to eliminate jamming in the first transporting path and the second transporting path. When an image is recorded on the sheet, since the fourth guide member is at the third position and the pivoting front-end side of the fifth guide member makes contact with the first guide member, no gap is developed on a guiding surface while the sheet is being transported from the fifth guide member to the first guide member. Moreover, when the sheet is fed from the tray, the pivoting front-end side of the fifth guide member is separated from the first guide member, and the sheet is transported to the first transporting path.

According to the present teaching, the first transporting path and the second transporting path are made accessible by switching the position of the first guide member and the position of the fourth guide member. Further, by making the pivoting front-end side of the fifth guide member at the fifth position contact with the first guide member, it is possible to realize smooth transporting of a sheet by eliminating the gap between the first guide member and the fifth guide member.

DETAILED DESCRIPTION OF THE PREFERRED EMBODIMENTS

An exemplary embodiment of the present invention will be described below by referring to the accompanying diagrams. However, the embodiment described below is merely an example of the present invention, and it is needless to mention that it is possible to make appropriate changes in the embodiment of the present invention without departing from the scope of the present invention.

<Multi-Function Device>

Figure 1:
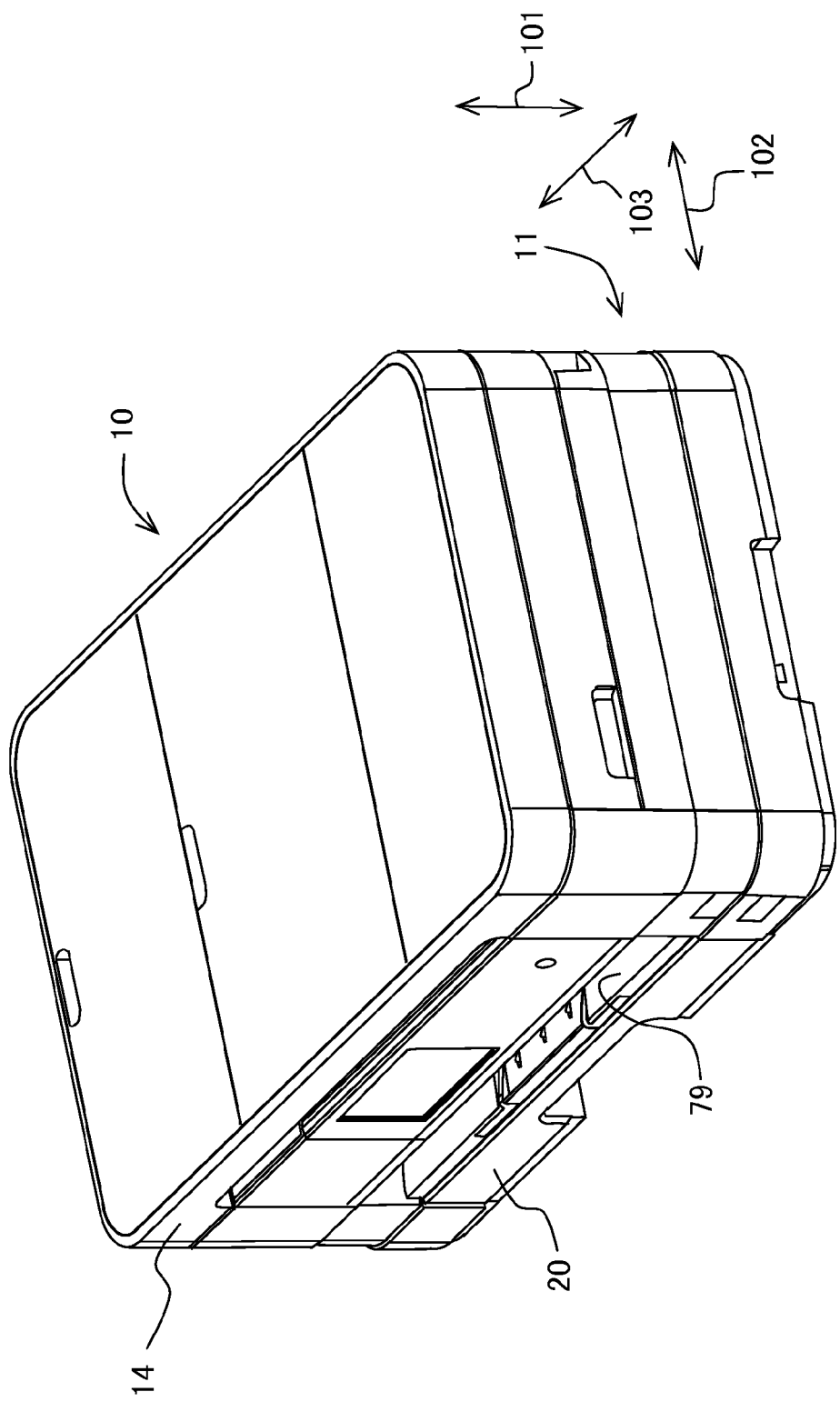
FIG. 1 is a perspective view when a multi-function device according to an embodiment of the present invention is viewed from a front side.

As shown in FIG. 1, a multi-function device 10 has an outer shape of a substantially rectangular parallelepiped. A printer section 11 of an inkjet recording type is provided at a lower portion of the multi-function device 10. The multifunction device 10 has various functions such as a facsimile function and a print function of recording an image on a recording paper (an example of a sheet). Functions other than the print function are arbitrary.

In the following description, a vertical direction 101 is defined with a state of the multi-function device 10 installed usably (a state shown in FIG. 1) as a base, and a frontward-rearward direction 102 is defined with a side on which a feeding tray 20 is installed, as a frontward side (front surface), and a leftward-rightward direction 103 is defined upon viewing the multi-function device 10 from a frontward side (front surface).

The printer section 11 includes a casing 14 (an example of an apparatus main-body). The feeding tray 20 which is capable of supporting recording papers of different sizes and different types is insertable into and extractable from the casing 14, in the frontward-rearward direction 102. In other words, the feeding tray 20 is installable in and removable from the multi-function device 10. A paper discharge tray 79 on which a recording paper having an image recorded thereon is to be discharged is provided at an upper side of the feeding tray 20.

Figure 2:
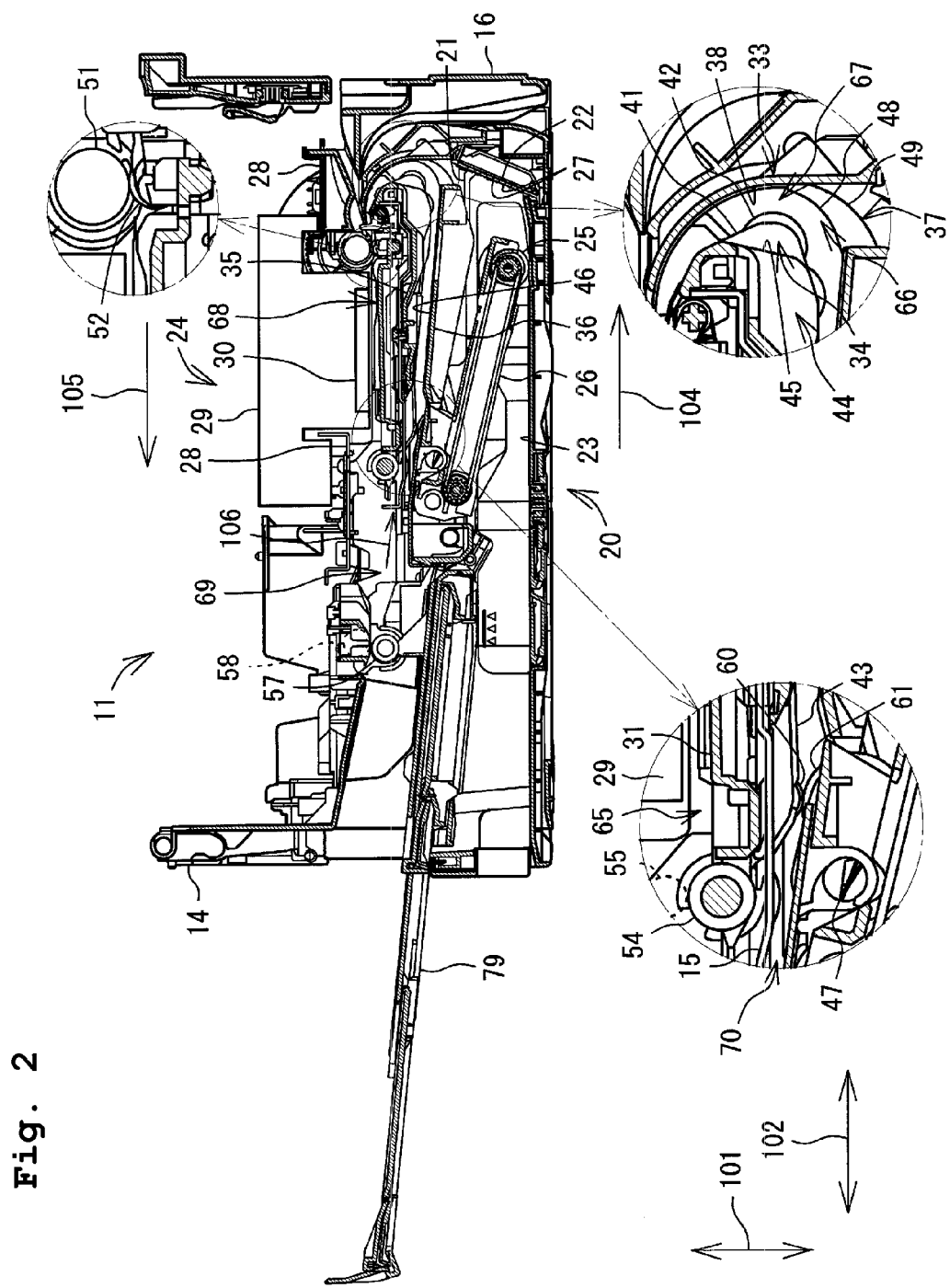
FIG. 2 is a cross-sectional view showing an internal structure of a printer section.

As shown in FIG. 2, a first guide member 33 is provided to a side surface of a rearward side of the multifunction device 10. When the first guide member 33 is moved from a state of being closed shown in FIG. 2, to a state of being opened shown in FIG. 4, FIG. 5, and FIG. 6 (hereinafter, "FIG. 4 to FIG. 6"), a first transporting path 65 is opened to an outside. The details will be described later.

<Structure of Printer Section 11>

As shown in FIG. 2, the printer section 11 includes a feed roller 25 which picks up and feeds a recording paper from the feeding tray 20, and a recording portion 24 of an ink jet type, which is provided at an upper side of the feeding tray 20, and which records an image on the recording paper by jetting ink droplets on to the recording paper.

<Feed Roller 25>

As shown in FIG. 2, the feed roller 25 is provided at the upper side of the feeding tray 20, with the leftward-rightward direction 103 as an axial direction. The feed roller 25 is rotatably supported by a front end of an arm 26 which is extended in a feeding direction 104. The front end of the arm 26 moves in the vertical direction 101 with an upstream side of the feeding direction 104 as a pivot. The feed roller 25 rotates by a driving force of a motor being transmitted by a drive transmission mechanism by a gear or a belt. By the feed roller 25 being rotated, the recording paper at the top from among the plurality of recording papers stacked on the feeding tray 20 is sent in the feeding direction 104.

<Recording Portion 24>

As shown in FIG. 2, the recording portion 24 is arranged at an upper side of the feeding tray 20. The recording portion 24 includes components such as a carriage 29 and a recording head 30. The carriage 29 is extended in the leftward-rightward direction 103 (direction perpendicular to the paper surface in FIG. 2), and is supported by a pair of guide rails 28 which is arranged to be isolated in the frontward-rearward direction 102. The driving force from the motor is transmitted to the carriage 29, and the carriage 29 reciprocates in the leftward-rightward direction 103 along the guide rail 28.

The recording head 30 is mounted on a lower-surface side of the carriage 29. The recording head 30, while in the process of reciprocating in the leftward-rightward direction 103 together with the carriage 29, jets ink droplets selectively from a plurality of nozzles. A method of recording by the recording portion 24 is not restricted to any particular method, and may be a method of recording an image by thermal transfer.

The platen 31 which supports the recording paper is provided at a position below the recording portion 24, facing the recording portion 24 and sandwiching the first transporting path 65. The platen 31 has a supporting surface spread in the leftward-rightward direction 103 in which the recording head 30 moves. An image recording is carried out on the recording paper by landing of the ink droplets jetted from the recording head 30 on the recording paper in a state that the recording paper transported through the first transporting path 65 is supported and stopped by the platen 31.

<Transporting Rollers 51, 54, 57, and 60>

As shown in FIG. 2, a first transporting roller 51 and a pinch roller 52 are provided between a connecting position 66 and the recording portion 24. The pinch roller 52 is arranged at a lower side of the first transporting roller 51, to be movable in the vertical direction 101, and makes a pressed contact with a roller surface of the first transporting roller 51 by an elastic member such as a spring. The first transporting roller 51 rotates by a driving force from a motor being transmitted. A recording paper which has entered the first transporting path 65 upon being fed from the feeding tray 20 is pinched between the first transporting roller 51 and the pinch roller 52. The recording paper receives the rotation of the first transporting roller 51 and is transported in a transporting direction 105.

A second transporting roller 54 and a spur 55 are provided at a downstream side in the transporting direction 105, of the platen 31. The spur 55 is arranged at an upper side of the second transporting roller 54, to be movable in the vertical direction, and makes a pressed contact with a roller surface of the second transporting roller 54 by an elastic member such as a spring. The second transporting roller 54 rotates by a driving force from a motor being transmitted. A recording paper having an image recorded thereon by the recording portion 24 is pinched between the second transporting roller 54 and the spur 55, and is transported in the transporting direction 105.

A third transporting roller 57 and a spur 58 are provided at a position, which is downstream side in the transporting direction 105 with respect to the second transporting roller 54 and the spur 55, and which is near to a downstream end of the first transporting path 65 in the transporting direction 105. The spur 58 is arranged at an upper side of the third transporting roller 57, to be movable in the vertical direction 101, and makes a pressed contact with a roller surface of the third transporting roller 57 by an elastic member such as a spring. The third transporting roller 57 rotates by a driving force from a motor being transmitted. The third transporting roller 57 and the spur 58 pinch the recording paper, and transport the recording paper to a downstream side in the transporting direction 105, and discharge the recording paper to a paper discharge tray 79. Or, the third transporting roller 57 and the spur 58 pinch the recording paper, and transport it in a direction opposite to the transporting direction 105.

A second transporting path 70 is provided with a fourth transporting roller 60 and a pinch roller 61. The pinch roller 61 is arranged at a lower side of the fourth transporting roller 60, to be movable in the vertical direction 101, and makes a pressed contact with a roller surface of the fourth transporting roller 60 by an elastic member such as a spring. The fourth transporting roller 60 rotates by a driving force from a motor being transmitted. The fourth transporting roller 60 and the pinch roller 61 pinch the recording paper, and transport it to a downstream side of a transporting direction 106 in the second transporting path 70, in other words, transport the recording paper from a connecting position 69 to a connecting position 66.

<Feeding Tray 20>

As shown in FIG. 2, the feeding tray 20 is installed in the casing 14, at a lower side of the recording portion 24 and the feed roller 25. Moreover, the feeding tray 20 can be drawn frontward (left side in FIG. 2) from the casing 14. The feeding tray 20 has a mounting surface 23 on which the recording papers are to be placed. The mounting surface 23 is rectangular-shaped in a plan view from above. Sizes and types of the recording papers which are to be placed on the feeding tray 20 are different. The type of recording paper may be classified according to a thickness, a material, or a surface treatment. The size and the type of the recording paper which can be placed on the mounting surface 23 of the feeding tray 20 is to be determined appropriately by a person having ordinary skill in the art. A side wall 21 (an example of a supporting portion) is provided to both sides in the leftward-rightward direction 103 of the mounting surface 23 of the feeding tray 20. The side wall 21 is a wall which is erected upward from the mounting surface 23. A fourth guide member 36 which will be described later is supported at a fourth position by an upper end of the side wall 21.

<Inclined Plate 22>

As shown in FIG. 2, an inclined plate 22 is provided to a rear-surface side of the casing 14. The inclined plate 22 is positioned at an inner side of the feeding tray 20, in a state that the feeding tray 20 is installed in the casing 14, and is exposed to a front-end side of the recording paper placed on the mounting surface 23. The inclined plate 22 is inclined such that, rear side of the inclined plate 22 is higher in position than front side of the inclined plate 22. The inclined plate 22 directs upward a side of a downstream end in the transporting direction 105 of the recording paper, and guides to the first transporting path 65. A plurality of separating protruding pieces 27 lined up along the feeding direction 104 is provided to a center in the leftward-rightward direction 103 of the inclined plate 22. The separating protruding piece 27 is in the form of a plate spring protruded from the inclined plate 22 toward the mounting surface 23. Even when the plurality of recording papers which is guided to the first transporting path 65 along the inclined plate 22 is in an overlapped state, the recording papers are separated by the front end of the plurality of recording papers being abutted with the separating protruding piece 27, and only the recording paper at the top is supplied to the first transporting path 65.

<First Transporting Path 65>

As shown in FIG. 2, at an interior of the printer section 11, the first transporting path 65 running from the inclined plate 22 up to the paper discharge tray 79 via the recording portion 24 is formed. The first transporting path 65 is divided into a curved portion 67 and an extending portion 68. The curved portion 67 is formed between the inclined plate 22 and the first transporting roller 51. The extending portion 68 is formed between the first transporting roller 51 and the paper discharge tray 79 via the recording portion 24.

The curved portion 67 is a curved passage having a laterally facing U-shape from the inclined plate 22 up to the first transporting roller 51. A recording paper which has been fed from the feeding tray 20 is guided along the curved portion 67, and after having a downstream side in the transporting direction 105 lifted upward, is turned around to a frontward side.

The curved portion 67 is defined by the first guide member 33 and a second guide member 34 which are facing mutually while being separated by the curved portion 67. The first guide member 33 is arranged at an outer side of the curved portion 67, and the second guide member 34 is arranged at an inner side of the curved portion 67.

The extending portion 68 is a straight passage along the frontward-rearward direction 102, running from the first transporting roller 51 up to the paper discharge tray 79 via the recording portion 24. Appropriate guide members are arranged in the extending portion 68, at locations at which the recording portion 24, the platen 31, the first transporting roller 51, the pinch roller 52, the second transporting roller 54, the spur 55, the third transporting roller 57, and the spur 58 are not provided.

<Second Transporting Path 70>

As shown in FIG. 2, the second transporting path 70 is connected to the connecting positions 66 and 69 of the first transporting path 65. The connecting position 66 is positioned between the first transporting roller 51 and the inclined plate 22 in the curved portion 67 of the first transporting path 65, and the connecting position 69 is positioned between the second transporting roller 54 and the third transporting roller 57 in the extending portion 68 of the first transporting path 65. The second transporting path 70 is formed to be inclined downward to descend downward from the connecting position 69 toward the connecting position 66.

The second transporting path 70 is defined by a third guide member 35 and the fourth guide member 36 which are facing mutually in the vertical direction 101. The third guide member 35 is arranged at an upper side of the second transporting path 70. The fourth guide member 36 is arranged at a lower side of the second transporting path 70. A fifth guide member 37 is provided toward the connecting position 66 on the fourth guide member 36. The fifth guide member 37 is pivotable with respect to the fourth guide member 36.

<Cover 16>

Figure 4:
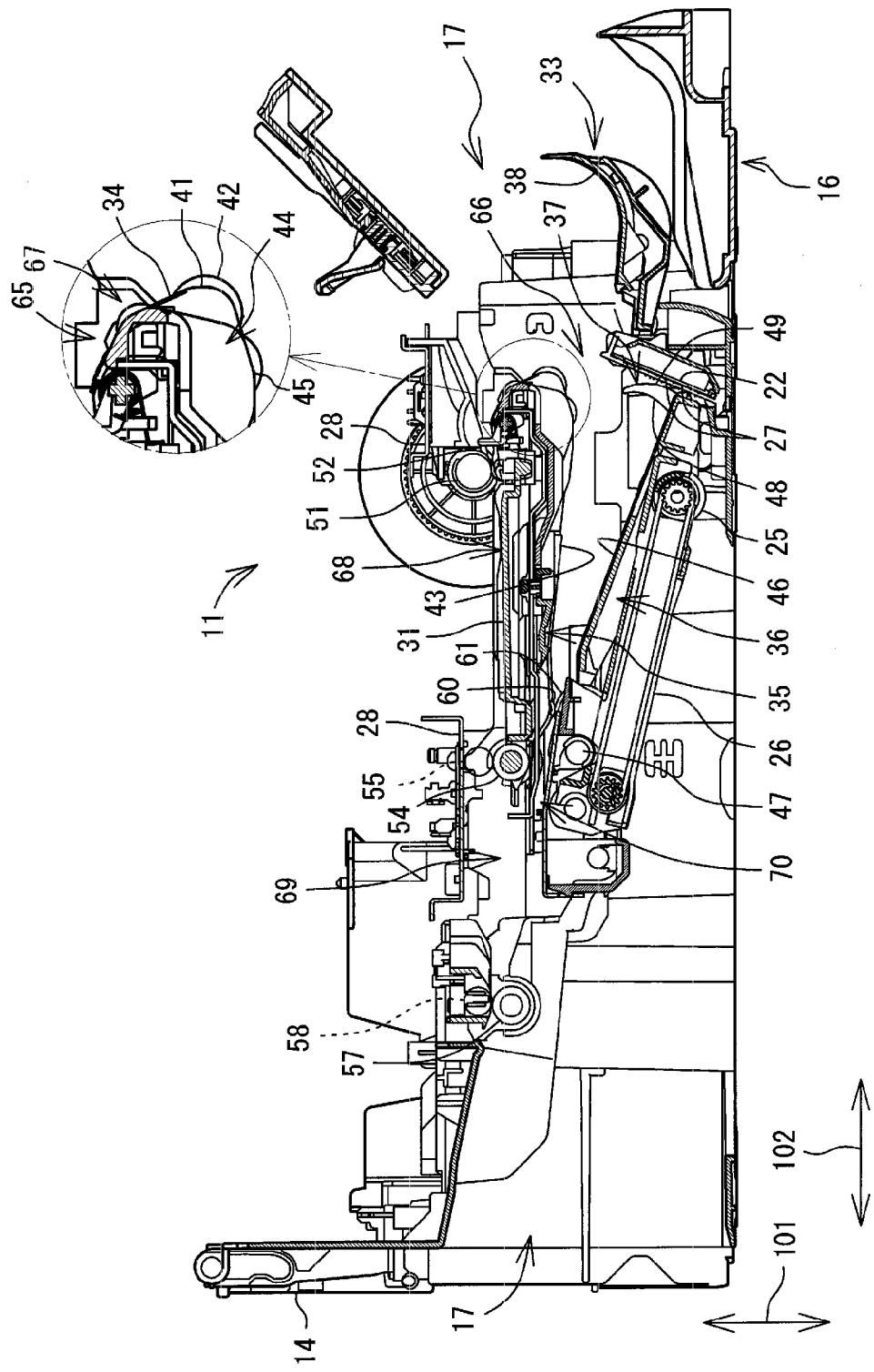
FIG. 4 is a cross-sectional view showing the printer section in a state that a feeding tray is drawn out.
Figure 5:
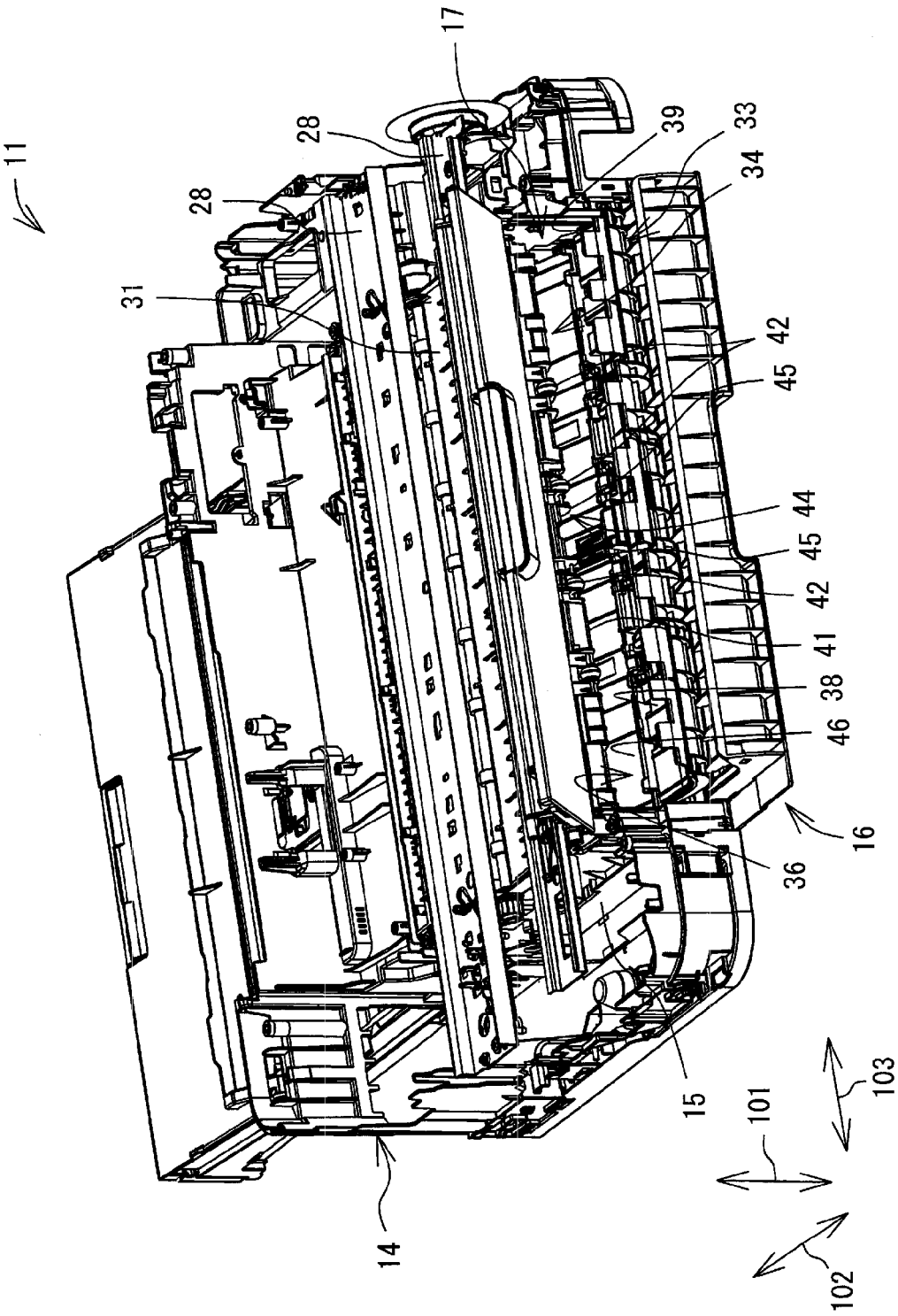
FIG. 5 is a perspective view showing the rear-surface side of the printer section in a state that the cover and a first guide member are opened.
Figure 6:
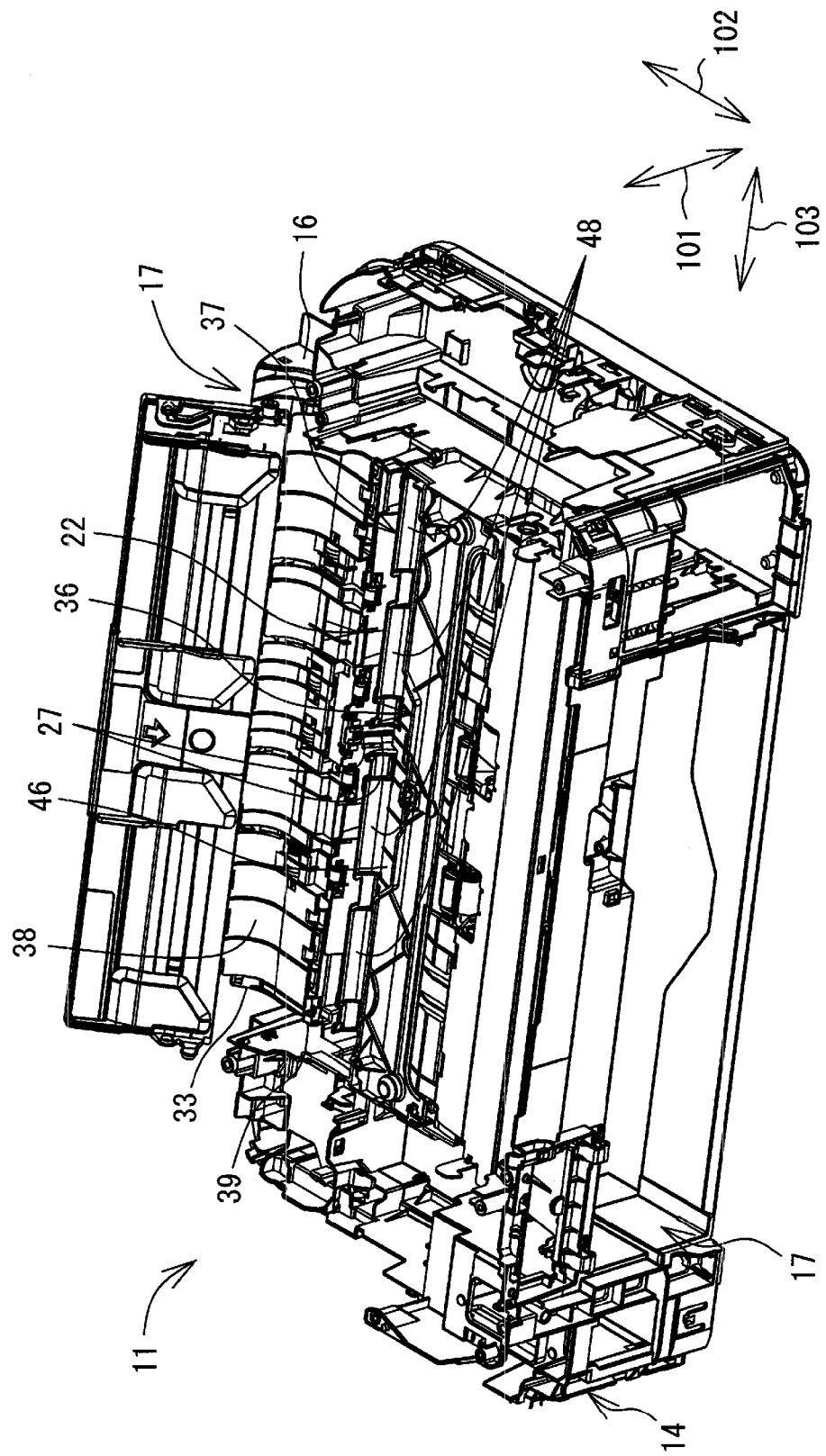
FIG. 6 is a perspective view showing a front-surface side of the printer section in the state that the cover and the first guide member are opened.

As shown in FIG. 4 to FIG. 6, an opening 17 is formed in a part of a rear surface of the casing 14. The opening 17 has a length equivalent to a length of the inclined plate 22 in the leftward-rightward direction 103, and is nearly equal to a distance from an upper end of the inclined plate 22 up to the first transporting roller 51 in the vertical direction 101. The opening 17 is openable and closable by a cover 16. Although it is not shown in the diagrams, the cover 16 is assembled to the casing 14 by a spindle protruded in the leftward-rightward direction 103 at a lower-end side thereof being pivotably supported by the casing 14. In a state that the opening 17 is closed, the cover 16 is positioned at an outer side of the curved portion 67 of the first transporting path 65. As the cover 16 is pivoted and the opening 17 is opened, the first guide member 33 is exposed through the opening 17.

<First Guide Member 33>

As shown in FIG. 2, and FIG. 4, FIG. 5, FIG. 6, and FIG. 7 (hereinafter, "FIG. 4 to FIG. 7"), the first guide member 33 has a first guiding surface 38 which defines the curved portion 67 of the first transporting path 65. The first guiding surface 38 has a length equivalent to the length of the inclined plate 22 in the leftward-rightward direction 103. The first guiding surface 38 is not necessarily required to be a flat and smooth surface, and a rib which is extended along the transporting direction 105 may be formed appropriately, for reducing a friction with a recording paper.

A spindle 39 is provided to both sides in the leftward-rightward direction 103 near a lower end of the first guide member 33. The spindle 39 protrudes from the first guide member 33 along the leftward-rightward direction 103. By the spindle 39 being pivotably supported by the casing 14, the first guide member 33 is rotatably assembled to the casing 14. Two ends of a range in which the first guide member 33 is moved with respect to the casing 14 are to be called as a first position and a second position.

As shown in FIG. 2, at the first position, the first guide member 33 defines the curved portion 67 of the first transporting path 65. The first guide member 33 which is positioned at the first position is in a state of being erected upward with the spindle 39 as a lower end. In the state that the first guide member 33 is erected upward, the first guiding surface 38 is directed substantially toward a front side of the casing 14, and an upper end thereof is positioned near the first transporting roller 51, and a lower end thereof is positioned near the upper end of the inclined plate 22.

As shown in FIG. 4 to FIG. 6, at the second position, the first guide member 33 is opened to an outer side (rear side) of the casing 14. In a state that the cover 16 is opened, when the first guide member 33 is pivoted from the first position up to the second position with the spindle 39 as a center, the curved portion 67 is exposed to an outside through the opening 17. A limit on a range of the rotation of the first guide member 33 is determined by an abutting with the casing 14.

<Second Guide Member 34>

As shown in FIG. 2, FIG. 4, FIG. 5, and FIG. 7, the second guide member 34 has a second guiding surface 41 which defines the curved portion 67 of the first transporting path 65. The second guiding surface 41 defines an inner wall of the curved portion 67 of the first transporting path 65. The second guiding surface 41 has a length equivalent to a length of the inclined plate 22 in the leftward-rightward direction 103. The second guiding surface 41 is not necessarily required to be a flat and smooth surface, and a rib which is extended along the transporting direction 105 may be formed appropriately, for reducing a friction with a recording paper. A lower end of the second guiding surface 41 is near the connecting position 66, and an upper end of the second guiding surface 41 is near the first transporting roller 51.

As shown in FIG. 2, FIG. 4, FIG. 5, and FIG. 7, the second guide member 34 has a plurality of rollers 42, a part of which is exposed from the second guiding surface 41. The roller 42 is rotatably supported by the second guide member 34, with the leftward-rightward direction 103 as an axial direction. The plurality of rollers 42 is arranged to be coaxial at mutually isolated positions in the leftward-rightward direction 103. Moreover, the plurality of rollers 42 is lined up along the transporting direction 105. A part of an outer peripheral surface of each roller 42 is protruded from the second guiding surface 41. The recording paper which is transported along the second guiding surface 41 makes a contact with the roller 42. At the time of making a contact, the roller 42, by being rotated with the transporting of the recording paper, the friction between the recording paper and the second guiding surface 41 is reduced.

<Third Guide Member 35>

As shown in FIG. 2 and FIG. 4 to FIG. 7, the third guide member 35 has a third guiding surface 43 which defines an upper wall of the second transporting path 70. The third guiding surface 43 has a length equivalent to the length of the inclined plate 22 in the leftward-rightward direction 103. The third guiding surface 43 is not necessarily required to be a flat and smooth surface, and a rib which is extended along the transporting direction 106 may be formed appropriately, for reducing a friction with the recording paper. One end portion of the third guiding surface 43 is positioned near the connecting position 69, and the other end portion of the third guiding surface 43 is positioned near the connecting position 66.

As shown in FIG. 5, in the vicinity of the connecting position 66 on the third guiding surface 43, a recess 44 (an example of a concave portion) which is dented upward is formed at a center of the leftward-rightward direction 103. The recess 44 is a portion through which, a thick recording paper having a narrow width in the leftward-rightward direction 103 passes. By the recess 44, since a curvature near the connecting position 66 on the third guiding surface becomes gentle, in other words, a radius of curvature becomes large, it is possible to guide the thick recording paper having a narrow-width without causing a small curvature. Even the recess 44 is provided with a rib 45 which is extended along the transporting direction 106, and a sliding friction with the recording paper is reduced by the rib 45.

<Fourth Guide Member 36>

As shown in FIG. 2 and FIG. 4 to FIG. 7, the fourth guide member 36 has a fourth guiding surface 46 which defines a lower wall of the second transporting path 70. The fourth guiding surface 46 has a length equivalent to the length of the inclined portion 22 in the leftward-rightward direction. The fourth guiding surface 46 is not necessarily required to be a flat and smooth surface, and a rib which is extended along the transporting direction 106 may be formed appropriately, for reducing a friction with the recording paper. One end portion of the fourth guiding surface 46 is positioned near the connecting position 69, and the other end portion of the fourth guiding surface 46 is positioned near the connecting position 66.

The fourth guide member 36 is provided with a spindle 47 at both sides in the leftward-rightward direction 103 near the connecting position 69. Each spindle 47 is protruded along the leftward-rightward direction 103 from the fourth guide member 36. By the spindle 47 being rotatably supported by the casing 14 or an internal frame 15, the fourth guide member 36 is rotatably assembled inside the casing 14. Two ends of a range in which the fourth guide member 36 is pivoted, are to be called as a third position and a fourth position.

As shown in FIG. 2, at the third position, the fourth guide member 36 defines the second transporting path 70. In a state of the fourth guide member 36 positioned at the third position, a front end near the connecting position 66 on an opposite side of the spindle 47 is positioned at a slightly lower side of the upper end of the inclined plate 22. As shown in FIG. 2, by a lower surface of the fourth guide member 36, toward both end sides in the leftward-rightward direction 103 being supported by the side wall 21 of the feeding tray 20, the fourth guide member 36 is held at the third position.

As shown in FIG. 4 to FIG. 6, at the fourth position, the fourth guide member 36 is away downwardly from the third guide member 35. The fourth guide member 36, by being pivoted from the third position to the fourth position with the spindle 47 as a center, opens the second transporting path 70 to an outside via the curved portion 67 of the first transporting path 65. A limit of a range of the rotation of the fourth guide member 36 is determined by abutting of the fourth guide member 36 with a mounting surface of the multi-function device 10 and the casing 14. As shown in FIG. 4, as the feeding tray 20 is drawn out from the casing 14 and the side wall 21 ceases to exist at a lower side of the fourth guide member 36, the fourth guide member 36 is pivoted from the third position to the fourth position due to a weight of the fourth guide member 36. A front end of the fourth guide member 36 at the fourth position, near the connecting position 66 on the opposite side of the spindle 47 is positioned near a lower end of the inclined plate 22.

<Fifth Guide Member 37>

As shown in FIG. 2, FIG. 4, FIG. 6, and FIG. 7, the fifth guide member 37 has a fifth guiding surface 48 which defines a lower-side portion of the second transporting path 70. The fifth guiding surface 48 is a surface which is spread along the leftward-rightward direction 103, and is arranged in plurality to be mutually isolated in the leftward-rightward direction 103. The fifth guide member 37 has on an opposite side of the fifth guiding surface 48, a sixth guiding surface 49 which defines the curved portion 67 of the first transporting path 65. The sixth guiding surface 49 is facing the first guiding surface 38 of the first guide member 33, and is curved in the same manner as the first guiding surface 38. The fifth guiding surface 48 and the sixth guiding surface 49 are not necessarily required to be flat and smooth surfaces and a rib which is extended along the transporting direction 106 may be formed appropriately, for reducing a friction with the recording paper.

As shown in FIG. 6, the fifth guide member 37 does not exist at a position which is at a center in the leftward-rightward direction 103 of the fourth guide member 36, and facing the separating protruding piece 27 of the inclined plate 22. A location where the fifth guide member 37 does not exist corresponds to a retracting portion. In the embodiment, regarding locations corresponding to the separating protruding pieces 27, the location at which the fifth guide member 37 does not exist is called as the retracting portion. However, the fifth guide member 37 exists along the leftward-rightward direction 103, and a recess in the sixth guiding surface 49, which is dented toward the fifth guiding surface 48, may be formed as the retracting portion, at a location corresponding to the separating protruding piece 27.

Although it is not shown in the diagrams, the fifth guide member 37 is provided with a spindle on a side of the connecting position 69 at both sides in the leftward-rightward direction. The spindle being rotatably supported by the fourth guide member 36, the fifth guide member 37 is rotatably assembled to the fourth guide member 36. Two ends of a range, in which the fifth guide member 36 is pivoted, are to be called as a fifth position and a sixth position.

As shown in FIG. 2, at the fifth position, a rotating front-end of the fifth guide member 37 abuts with the first guide member 33. As shown in FIG. 2, when the fourth guide member 36 is positioned at the third position, by a front end of the fifth guide member 37 being supported by the first guide member 33 positioned at the first position, the fifth guide member 37 is held at the fifth position. The rotating front-end of the fifth guide member 37 at the fifth position may abut with a surface of the first guide member 33 or may abut with a rib provided to the first guide member 33.

Figure 7:
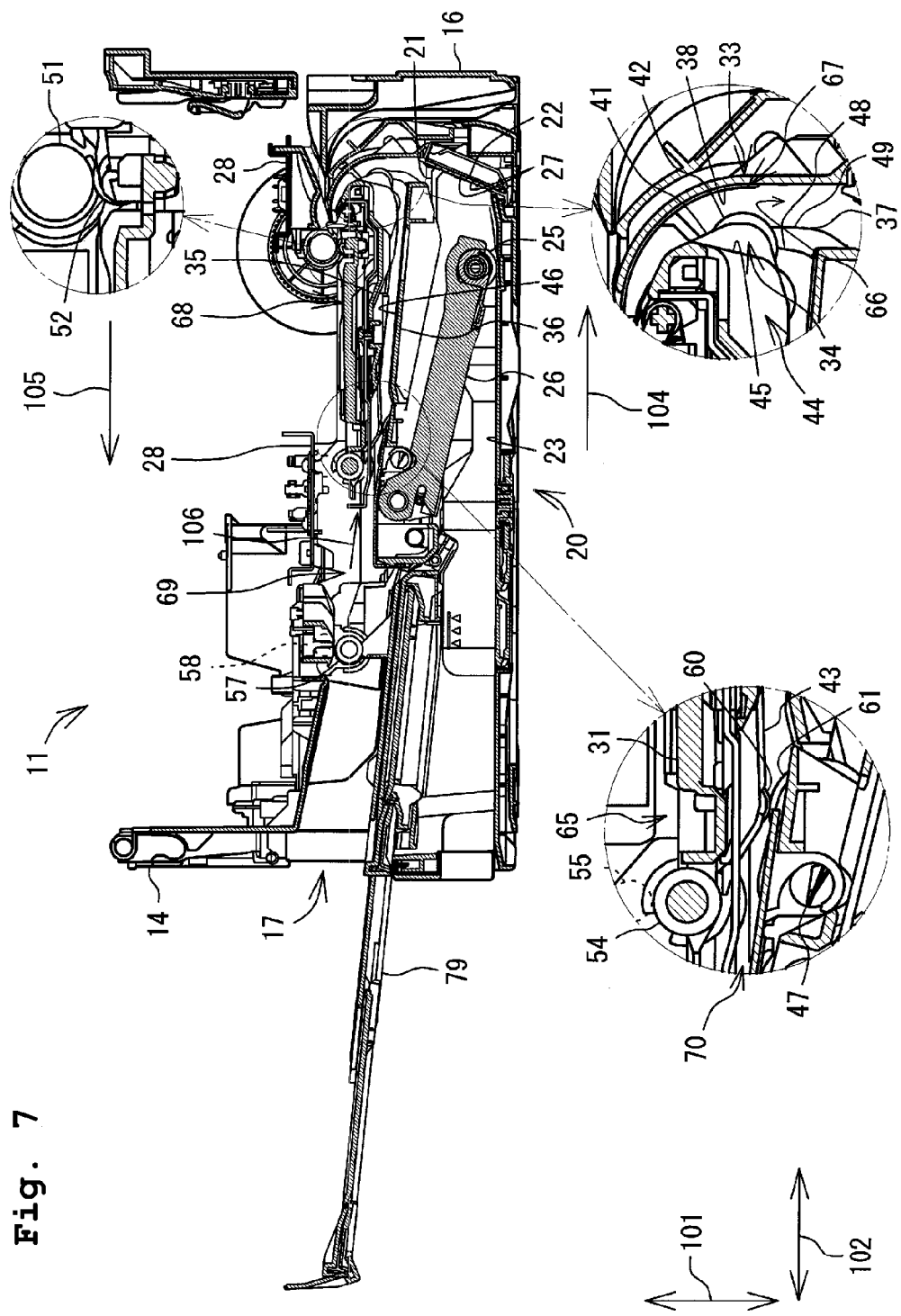
FIG. 7 is a cross-sectional view of the printer section in a state that a fifth guide member is at a sixth position.

As shown in FIG. 7, at the sixth position, a rotating front-end of the fifth guide member 37 is separated away from the first guide member 33. As shown in FIG. 7, when the fourth guide member 36 is positioned at the third position, by the recording paper abutting with the fifth guide member 37 from a lower side, the fifth guide member 37 is pivoted from the fifth position to the sixth position. At the sixth position, the rotating front-end of the fifth guide member 37 is positioned on a side of the second guide member 34 of a peripheral surface of the roller 42 provided to the second guide member 34. In other words, the roller 42 does not exist at a position where the rotating front-end of the fifth guide member 37 positioned at the sixth position is.

As shown in FIG. 4, as the fourth guide member 36 is pivoted from the third position to the fourth position, the fifth guide member 37 also moves downward together with the fourth guide member 36. At this time, the rotating front-end of the fifth guide member 37 is positioned at a lower side of the upper end of the inclined plate 22. Moreover, at this time, the fifth guide member 37 abuts with the inclined plate 22. However, since the fifth guide member 37 does not exist at a position of the inclined plate 22 corresponding to the separating protruding piece 27, the fifth guide member 37 does not make a contact with the separating protruding piece 27.

<Image Recording Operation>

Figure 3:
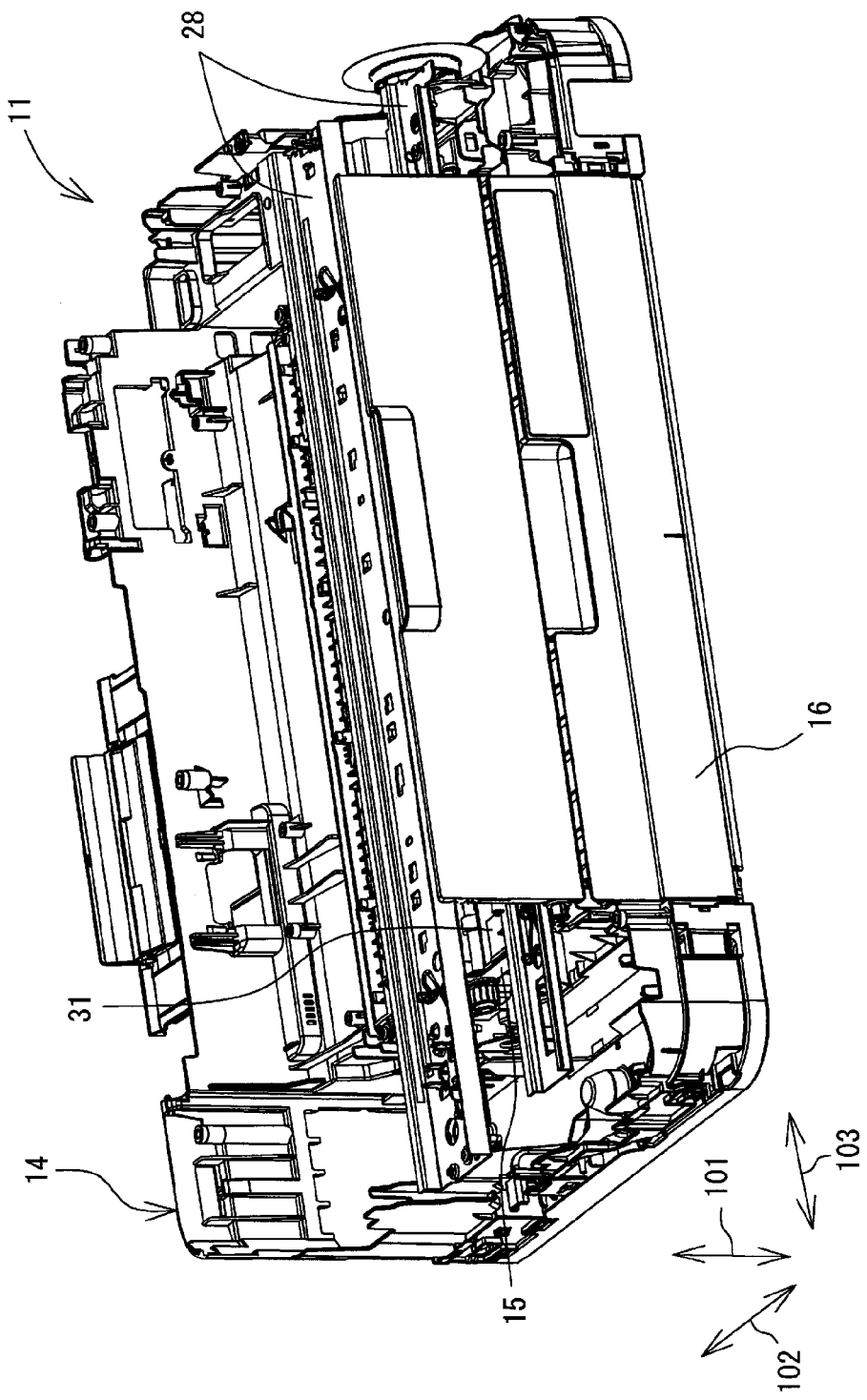
FIG. 3 is a perspective view showing a rear-surface side of the printer section in a state that a cover is closed.

As shown in FIG. 2 and FIG. 3, when the image recording is carried out on one surface of the recording paper, the cover 16 is in a state of having the opening 17 closed, and the first guide member 33 is positioned at the first position. Moreover, since the feeding tray 20 is loaded on the casing 14, the fourth guide member 36 is positioned at the third position in a state of being supported by the side wall 21 of the feeding tray 20. Moreover, the fifth guide member 37 is positioned at the fifth position.

The printer section 11 receives an instruction for print start, and each of the feed roller 25, the first transporting roller 51, the second transporting roller 54, the third transporting roller 57, and the fourth transporting roller 60 is driven at a timing determined in advance. As the feed roller 25 is rotated, a recording paper placed at the top in the feeding tray 20 is sent in the feeding direction 104. The recording paper is guided to the first transporting path 65 by the inclined plate 22.

A front end of the recording paper which is transported while being curved along the curved portion 67 of the first transporting path 65, at the connecting position 66, abuts with the sixth guiding surface 49 of the fifth guide member 37 which is positioned at the fifth position. The front end of the recording paper is guided toward the first guiding surface 38 by the sixth guiding surface 49, and near the first guiding surface 38, lifts up the fifth guide member 37. Accordingly, as shown in FIG. 7, the fifth guide member 37 is pivoted from the fifth position to the sixth position, and a gap through which the recording paper can pass is developed between the rotating front-end of the fifth guide member 37 and the first guiding surface 38. The recording paper passes through the gap developed. As the recording paper passes through the gap, the fifth guide member 37 is pivoted from the sixth position to the fifth position by a weight of the fifth guide member 37.

As the recording paper passes through the curved portion 67 of the first transporting path 65, the front end of the recording paper is pinched between the first transporting roller 51 and the pinch roller 52, and the recording paper is transported on to the platen 31. Transporting of the recording paper with the front end located on the platen 31 is stopped once, and while the recording paper is at rest, the recording head 30 jets ink droplets toward the recording paper on the platen 31 while moving in the leftward-rightward direction 103 together with the carriage 29. By such stoppage of transporting, and jetting of ink droplets being repeated, an image is recorded on the recording paper.

The recording paper which advances in the transporting direction 105 through the extending portion 68 of the transporting path 65 is transported by being pinched by the second transporting roller 54 and the spur 55, and then by the third transporting roller 57 and the spur 58. Moreover, as the image recording is completed, the second transporting roller 54 and the third transporting roller 57 are rotated continuously, and the recording paper is discharged from the extending portion 68 of the first transporting path 65 to the paper discharge tray 79.

An operation of image recording on both sides of the recording paper is similar to a case of one-sided image recording on the first surface of the recording paper. After the image recording on the first surface of the recording paper is completed, in the printer section 11, the second transporting roller 54 and the third transporting roller 57 rotate continuously. A rear-end side of the recording paper passes over the connecting position 69, and while the recording paper is in a state of being pinched between the third transporting roller 57 and the spur 58, the third transporting roller 57 stops. Next, the third transporting roller 57 is rotated in a reverse direction. Accordingly, the recording paper is transported in a reverse direction of the transporting direction 105 toward the connecting position 69 such that, an upstream end of the transporting direction 105 becomes the front end.

The recording paper which has reached the connecting position 69 enters the second transporting path 70 from the first transporting path 65. In the embodiment, a flap which guides the recording paper at the connecting position 69 has been omitted. However, an arrangement may be made such that, by providing a rotatable flap in order to determine a direction of guiding the recording paper at the connecting position 69, the recording paper is guided from the first transporting path 65 to the second transporting path 70.

The recording paper which is transported in the transporting direction 106 upon entering the second transporting path 70 is pinched between the fourth transporting roller 60 and the pinch roller 61, and is transported to the connecting position 66. As the front end of the recording paper reaches the connecting position 66, the recording paper is guided in the transporting direction 105 through the curved portion 67 of the first transporting path 65 by the fifth guide member 37 and the fifth guiding surface 48. Moreover, the recording paper is transported in the transporting direction 105 to the extending portion 68, with a second surface of the recording paper made to face the recording head 30. At this time, image recording on the second surface is carried out similarly as the image recording on the first surface. The recording paper having the image recording carried out on the first surface and the second surface is discharged from the extending portion of the first transporting path 65 to the paper discharge tray 79.

<Procedure for Removing Recording Paper>

At the time of removing a recording paper which is subjected to defective transporting in the second transporting path 70, as shown in FIG. 4 to FIG. 6, the cover 16 is pivoted and the opening 17 is opened. Moreover, the first guide member 33 which has been exposed to the outside through the opening 17 is moved from the first position to the second position. Accordingly, the curved portion 67 of the first transporting path 65 is opened to the outside. When the transporting defect of the recording paper has presumptively occurred in the curved portion 67 of the first transporting path 65, it is possible to remove the recording paper from the curved portion 67 by an operation explained heretofore.

Moreover, as the feeding tray 20 is drawn out from the casing 14, the fourth guide member 36 which had been supported by the side wall 21 of the feeding tray 20 is turned from the third position to the fourth position. Accordingly, the third guide member 35 and the fourth guide member 36 in the second transporting path 70 are away substantially, and the second transporting path is opened to the outside via the opening 17 and the curved portion 67 which has been opened. Consequently, it is possible to remove the recording paper from the second transporting path 70 through the opening 17 and the curved portion 67 which has been opened.

By carrying out an operation reverse of the abovementioned operation after the recording paper has been removed, the cover 16 is in a state of having the opening 17 closed, and the first guide member 33 is returned to the first position. Moreover, the feeding tray 20 is loaded on the casing 14, and by being supported by the side wall 21 of the feeding tray 20, the fourth guide member 36 is returned to the third position.

EFFECT OF THE EMBODIMENT

According to the embodiment, by switching over the position of the first guide member 33 and the position of the fourth guide member 34, the curved portion 67 of the first transporting path, and the second transporting path 70 become accessible, and removing of the recording paper becomes possible. Moreover, by making the rotating front-end side of the fifth guide member 37 positioned at the fifth position abut with the first guide member 33, it is possible to eliminate the gap between the first guiding surface 38 and the fifth guide member 37, and to transport the recording paper smoothly from the second transporting path 70 to the curved portion 67 of the first transporting path 65.

Moreover, by the feeding tray 20 being drawn out from the casing 14, the fourth guide member 36 is switched over from the third position to the fourth position. When the fourth guide member 36 is at the fourth position, by lowering the location of the fifth guide member 37 by lowering the rotating front end of the fifth guide member 37 to a lower side of the upper end of the inclined plate 22, it is possible to realize thinning of the printer section 11, and to make an opening of the second transporting path 70 large.

Moreover, since the rotating front-end of the fourth guide member 36 is positioned at a lower side of the upper end of the inclined plate 22, further thinning of the printer section 11 is realized.

Moreover, since the fifth guide member 37 is not provided at a location facing the separating protruding piece 27, when the fourth guide member 36 is positioned at the fourth position, it is possible to lower the rotating front-end of the fifth guide member 37 without allowing the fifth guide member 37 and the separating protruding piece 27 to make a contact.

Moreover, since the rotating front-end of the fifth guide member 37 positioned at the sixth position is positioned toward the second guide member 34 of the roller 42 provided to the second guide member 34, the recording paper is transported smoothly by the rotation of the roller 42, without the roller 42 and the rotating front-end of the fifth guide member 37 interfering.

Moreover, since the recess 44 which is dented in a direction away from the fourth guide member 36 is provided at the center in the leftward-rightward direction 103 of the third guide member 35, when a recording paper with a narrow width and a short length for example, has stopped due to a transporting defect in the second transporting path 70, the recording paper which has stopped becomes easily visible. Moreover, a space for inserting a finger by a user for removing the recording paper stopped is developed. Moreover, when a thick and short-width recording paper is to be transported from the second transporting path 70 to the curved portion 67 of the first transporting path 65, it is possible to make large a radius of curvature of the recording paper by making the recording paper pass through the recess 44.

Moreover, since the rib 45 which is protruded toward the fourth guide member 36 is provided to the recess 44, it is possible to reduce the sliding resistance between the recording paper and the third guide member 35.

Moreover, since the front end of the downstream side of the transporting direction 105 of the first guide member 33 positioned at the first position is positioned near the first transporting roller 51, a large portion of the curved portion 67 of the first transporting path 65 is openable by a change in posture of the first guide member 33.

MODIFIED EMBODIMENT

In the abovementioned embodiment, one feeding tray 20 is provided to the printer section 11. However, another feeding tray 80 may be provided to the printer section 11.

Figure 8:
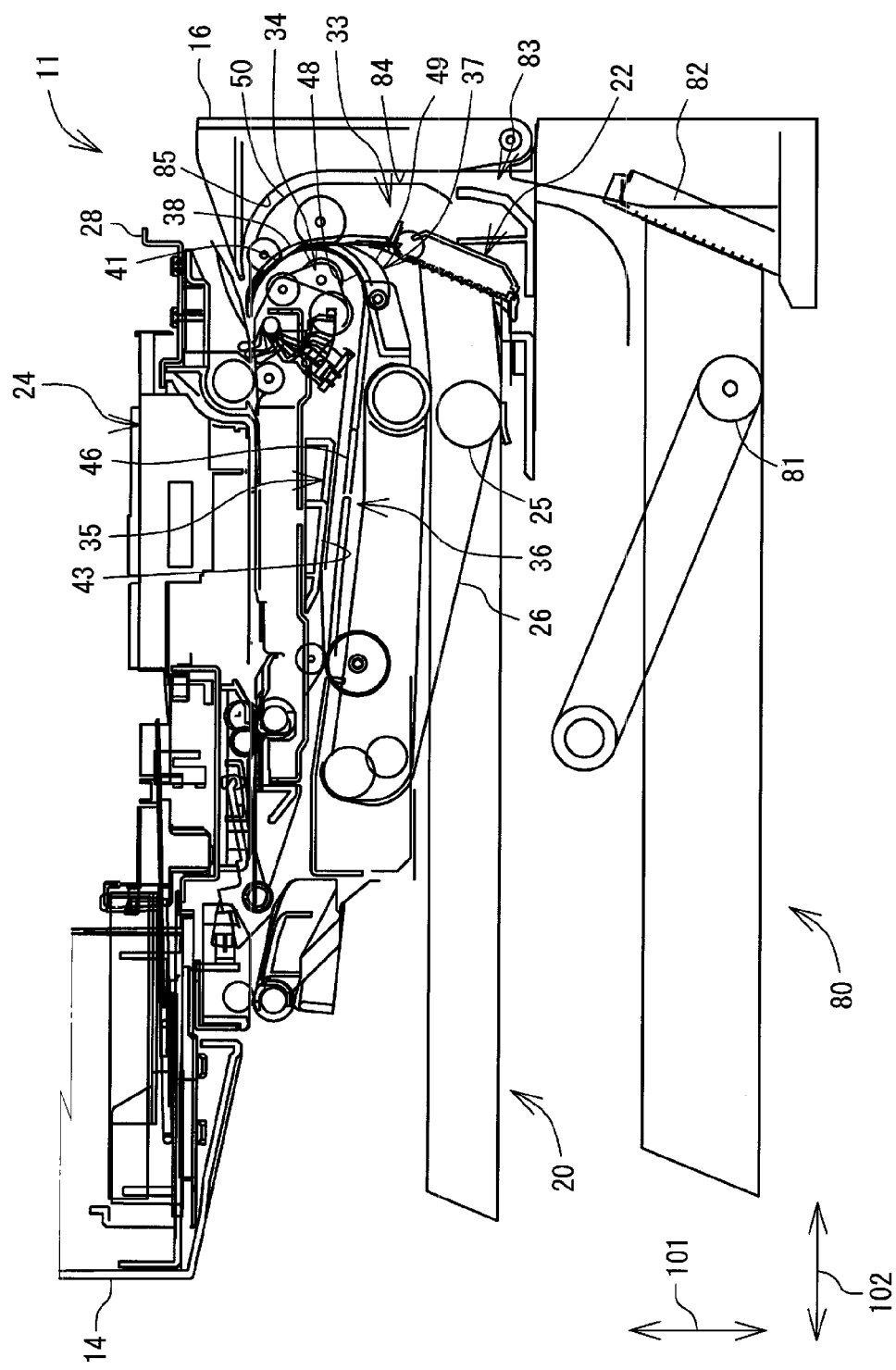
FIG. 8 is a schematic diagram showing a modified embodiment of the present invention.

As shown in FIG. 8, the feeding tray 80 (an example of a lower side tray) is arranged beneath the feeding tray 20. The feeding tray 80, similarly as the feeding tray 20, is a tray on which a plurality of recording papers is placed, and can be drawn out from the casing 14. In FIG. 8, as it is indicated in a simplified form, a feed roller 81 is provided at an upper side of the feeding tray 80. The feed roller 81, similarly as the feed roller 25, feeds a recording paper which is placed at the top on the feeding tray 80 in the feeding direction 104 by being rotated by a driving force from a motor. Moreover, an inclined plate 82 similar to the inclined plate 22 is provided to a rear-surface side of the feeding tray 80. The inclined plate 82 guides the recording paper which has been fed from the feeding tray 80, to a third transporting path 83.

As shown in FIG. 8, the third transporting path 83 is a curved passage having a laterally facing U-shape from a portion near an upper end of the inclined plate 82 up to the first transporting roller 51, at an outer side of a curve of the curved portion 67 of the first transporting path 65. A downstream end in the transporting direction 105 of the third transporting path 83 is connected to the curved portion 67 of the first transporting path 65 at an upstream side of the first transporting roller 51. A recording paper fed from the feeding tray 80 is guided along the third transporting path 83, and after having an upstream side in the transporting direction 105 lifted upward, is turned around toward the frontward side. Next, the recording paper enters the first transporting path 65 from the third transporting path 83.

The third transporting path 83 is defined by the first guide member 33 and a sixth guide member 84. The first guide member 33 is arranged at an inner side of the curve, and the sixth guide member 84 is arranged at an outer side of the curve. A seventh guiding surface 50 is formed on an opposite side of the first guiding surface 38, in the first guide member 33. The sixth guide member 84 has an eighth guiding surface 85 facing the seventh guiding surface 50. The seventh guiding surface 50 is not necessarily required to be a flat and smooth surface, and a rib which is extended along the transporting direction 105 may be formed appropriately, for reducing a friction with a recording paper.

The sixth guide member 84 is supported by an inner side of the cover 16, and is turned with respect to the casing 14, together with the cover 16. In a state of the cover 16 having closed the opening 17, the sixth guide member 84 defines the third transporting path 83. A position of the sixth guide member 84 at this time is to be called as a seventh position. In a state of the cover 16 having opened the opening 17, the sixth guide member 84 opens the third transporting path 83. A position of the sixth guide member 84 at this time is to be called as an eighth position.

At the seventh position, two ends in the leftward-rightward direction 103 of the upper end of the sixth guide member 84 abut with the first guide member 33 positioned at the first position. By abutting with the sixth guide member 33, the first guide member 33 is held at the first position.

In the modified embodiment, by the sixth guide member 84 being switched over from the seventh position to the eighth position by an operation of opening of the cover 16, the third transporting path 83 is opened. Moreover, by an operation similar as in the embodiment described above, the position of the first guide member 33 and the position of the fourth guide member 36 are switched over, and the curved portion 67 of the first transporting path 65, and the second transporting path 70 become accessible.

What is claimed is:

1. An image recording apparatus comprising:
   an apparatus main-body;
   a tray configured to be drawn out from the apparatus main-body and configured to support a sheet;
   a feed roller configured to feed the sheet from the tray to a first transporting path, wherein the first transporting path includes a curved portion which is curved upward and an extending portion which is connected to the curved portion;
   a transporting roller configured to transport the sheet in a transporting direction and disposed downstream of the feed roller with respect to the transporting direction in the first transporting path;
   a recording portion disposed downstream of the transporting roller with respect to the transporting direction in the first transporting path and configured to record an image on the sheet which is transported through the extending portion of the first transporting path;
   a first guide member configured to define an outer wall of the curved portion of the first transporting path and configured to move between a first position at which the first guide member defines the curved portion, and a second position at which the first guide member opens the curved portion of the first transporting path;
   a second guide member configured to define an inner wall of the curved portion of the first transporting path;
   a third guide member configured to define an upper wall of a second transporting path, wherein the second transporting path is configured to connect a portion of the extending portion, which is located downstream of the recording portion with respect to the transporting direction, and a portion of the curved portion, which is located upstream of the transporting roller with respect to the transporting direction;
   a fourth guide member configured to define a lower wall of the second transporting path and configured to pivot between a third position at which the fourth guide member defines the second transporting path and a fourth position at which the fourth guide member is more downwardly apart from the third guide member than when in the third position; and
   a fifth guide member disposed at a pivoting front-end side of the fourth guide member, and configured to pivot between a fifth position at which the fifth guide member contact the first guide member and a sixth position at which the fifth guide member is separated from the first guide member, in a state in which the fourth guide member is at the third position and the first guide member is at the first position.

2. The image recording apparatus according to claim 1, further comprising:
   a supporting portion disposed at the tray, the supporting portion configured to maintain the fourth guide member at the third position in a state in which the tray is at a position at which the feed roller can feed the sheet from the tray, and to make the fourth guide member pivot to the fourth position in a state in which the tray is drawn out from the apparatus main-body.

3. The image recording apparatus according to claim 2, further comprising an inclined plate disposed at a front-end side of the tray and configured to guide the sheet which has been fed from the tray to the first transporting path in the state in which the tray is at a position at which the feed roller can feed the sheet from the tray, wherein in a state in which the fourth guide member is at the fourth position, a pivoting front-end of the fifth guide member is located below an uppermost end of the inclined plate.

4. The image recording apparatus according to claim 3, wherein, in a state that the fourth guide member is at the third position, the pivoting front-end of the fourth guide member is located below the uppermost end of the inclined plate.

5. The image recording apparatus according to claim 3, wherein the inclined plate comprises a separating protruding piece configured to contact an edge of the sheet, and the fifth guide member has a retracting portion which faces the separating protruding piece, and to which the separating protruding piece retracts in a state in which the fourth guide member is at the fourth position.

6. The image recording apparatus according to claim 1, further comprising a roller disposed at the second guide member and configured to rotate about an axis extending in a direction orthogonal to the transporting direction, and in a state in which the fifth guide member is at the sixth position, a pivoting front-end of the fifth guide member is located closer to the second guide member than to a peripheral surface of the roller.

7. The image recording apparatus according to claim 1, wherein the third guide member has a concave portion dented in a direction away from the fourth guide member.

8. The image recording apparatus according to claim 7, further comprising a rib disposed at the concave portion, wherein the rib protrudes toward the fourth guide member and extends along the transporting direction.

9. The image recording apparatus according to claim 1, wherein in a state in which the first guide member is at the first position, a downstream end of the first guide member with respect to the transporting direction is located in a vicinity of the transporting roller.

10. The image recording apparatus according to claim 1, further comprising:
    a lower-side tray disposed below the tray and configured to support the sheet; and
    a sixth guide member configured to define a third transporting path together with the first guide member, wherein the third transporting path extends along an outer side of the curved portion of the first transporting path, and the third transporting path is configured to be connected to a portion of the first transporting path, which is located upstream of the transporting roller with respect to the transporting direction, and
    wherein the sixth guide member is configured to define an outer wall of the third transporting path, and configured to move between a seventh position at which the sixth guide member defines the third transporting path and an eighth position at which the sixth guide member opens the third transporting path.

11. The image recording apparatus according to claim 10, wherein in a state in which the sixth guide member is at the seventh position, the sixth guide member maintains the first guide member at the first position.

* * * * *